(No Model.)

J. FOUCHE.
PLOW.

No. 568,942. Patented Oct. 6, 1896.

Witnesses:

Inventor:
Joseph Fouche.
By Frederick Benjamin
Attorney

UNITED STATES PATENT OFFICE.

JOSEPH FOUCHE, OF VISALIA, CALIFORNIA.

PLOW.

SPECIFICATION forming part of Letters Patent No. 568,942, dated October 6, 1896.

Application filed May 6, 1896. Serial No. 590,449. (No model.)

*To all whom it may concern:*

Be it known that I, JOSEPH FOUCHE, a citizen of the Dominion of Canada, residing at Visalia, in the county of Tulare and State of California, have invented certain new and useful Improvements in Plows; and I do hereby declare the following to be a full, clear, and exact description of the invention, such as will enable others skilled in the art to which it appertains to make and use the same.

My invention relates to plows, and has for its object the provision of such a device by means of which plowing may be done close to rows of trees without injury thereto, either by the plow or by the team—that is, to plow a furrow parallel to the line upon which the team travels, so that the plow may be made to travel at a safe distance from the said rows.

With this object in view the invention consists of the details of construction and arrangement which will more fully appear hereinafter.

Figure 1:
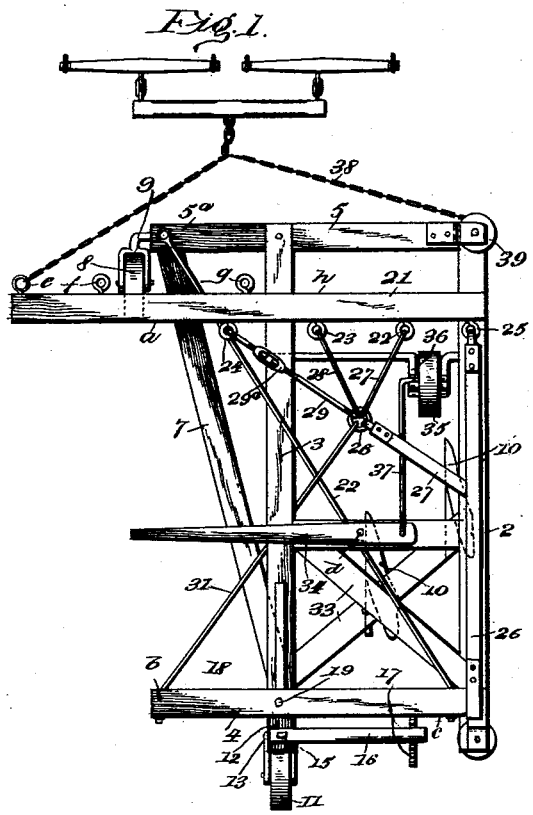
Figure 2:
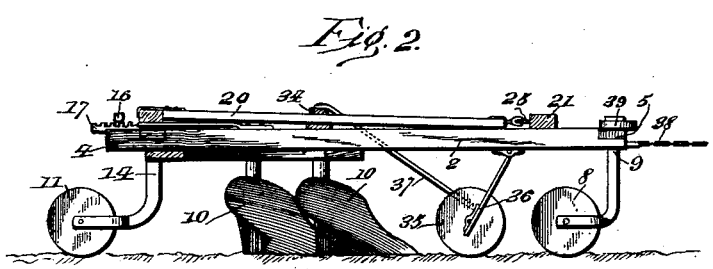

In the accompanying drawings, Figure 1 represents a plan view. Fig. 2 represents a side elevation.

Like numerals or letters of reference indicate corresponding parts in both views.

The frame of the plow is composed of longitudinal beams 2 and 3, which are held together at their ends by the cross-beams 4 and 5, the latter having an extension $5^a$, at the outer end of which an oblique brace 7 extends rearwardly to the beam 3. A caster-wheel 8 is hung from the extension $5^a$ by a swivel connection 9, to support the forward end of the said frame.

Cross-braces are rigidly secured to the under side of the parallel beams 2 and 3, to one of which are pivotally attached the plows 10. A second caster-wheel 11 is attached to the rear end 12 of the parallel beam 3 by a swivel connection 13, runs in the line of draft, and is used for supporting the rear of the frame and for regulating and turning the plow.

The standard 14 of the swivel connection 13 has a head 15 projecting upwardly through the end of the beam 3 and has a lever attached thereto, the said lever being used for regulating the direction of the caster-wheel 11. A toothed rack 17 is secured to the rear beam 4 and serves to lock the lever 16, thereby holding the caster-wheel 11 in any position in which it may be adjusted.

A cross-beam 18 is pivoted at 19 to the rear of the said frame, the said beam forming a part of the draft-equalizing attachment.

The numeral 20 represents a bar which is rigidly attached at its rear end to the pivoted cross-beam 18 and is hinged at the other end to the eyebolt 25 in the cross-bar 21. The cross-bar 21 acts as a singletree and has on its inner side *a* the four eyebolts 22 23 24 25.

The numeral 26 indicates a ring to which are hinged the inner ends of the rods 27 28 29. The forwards of the said rods are hinged to the eyebolts 22 23 24, respectively. A brace 7 is hinged at its inner end to the said ring, its rearward end being secured to the side beams 4. The rod 29 has a swivel connection $29^a$, which is used for lengthening and shortening the said rod. A rod 31 is also hinged at its inner end to the ring 26 and its opposite end to the end *b* of the pivoted cross-bar 18. A rod 22 is attached at its forward end to the projecting end $5^a$ of the beam 5, the rear end thereof passing through the end *c* of the rear cross-bar 18, the latter bar working thereon.

Situated midway of the frame formed by the parallel beams 2 3 4 5 is the cross-brace 33, to which is pivoted at *d* the lever 34. A caster-wheel 35 revolves in the U-shaped bearings 36, the ends of the said bearings being secured in journals on the under side of the parallel beams 2 and 3, respectively. A rod 37 connects the end of the lever 35 and the U-shaped bearings 36. By this means the penetration of the plowshares may be regulated. Eyebolts *e*, *f*, and *g* are placed at suitable intervals in the front side *h* of the beam 21, in which may be linked one of the ends of the chain 38, the other end of the said chain being attached to the forward end of the beam 2. A buffer consisting of a pivoted wheel 39 is placed on the upper side of the forward end of the beam 2 and serves to prevent injury to the trees or to the plow-frame.

The doubletree, to which the animals are attached, is hooked into the chain 38 at any suitable link, and it will be readily seen that the draft of the animals will be exerted upon the rods and chains.

Having thus described my invention, what I claim as new, and desire to secure by Letters Patent, is—

1. In a plow the combination with a frame supported by caster-wheels and carrying one or more plowshares, of a rear cross-bar pivoted to said frame, a side bar rigidly secured to said cross-bar, a front draft-bar hinged to said side bar, and a series of rods hinged to said draft-bar and connected with said rear bar by means of a rod secured in said rear cross-bar, and rings to which the inner ends of said rods are secured substantially as set forth.

2. In a plow, the combination with a frame supported by caster-wheels and carrying one or more plowshares, means for raising or lowering said shares, of a rear cross-bar pivoted to said frame, a side bar rigidly secured to said cross-bar, a front draft-bar hinged to said side bar, a series of rods hinged to said draft-bar and connected with said rear bar by means of a rod secured in said rear cross-bar, a ring to which the inner ends of said rods are loosely secured, and a toothed rack and means for guiding the rear caster-wheel for the purpose described.

3. In a plow, the combination with a main frame supported by caster-wheels and carrying one or more plowshares, of the cross-beams 18 and 21, the side bar 20, the rods 27, 28 and 29 hinged to the cross-beam 21, the rod 31 secured in the beam 18, the rod 22 secured in the beam 18 and to the front crosspiece of the frame, the ring 26 with which said rods are hinged, means for raising and lowering the frame, and means for guiding the same, substantially as described.

In testimony whereof I have signed this specification in the presence of two subscribing witnesses.

JOSEPH FOUCHE.

Witnesses:
R. F. ROTH,
D. McFADZEAU.